April 4, 1950          P. SYNEK          2,503,178

APPARATUS FOR AUTOMATICALLY MAKING BEADS

Filed July 8, 1947          8 Sheets-Sheet 1

April 4, 1950 P. SYNEK 2,503,178
APPARATUS FOR AUTOMATICALLY MAKING BEADS
Filed July 8, 1947 8 Sheets-Sheet 3

INVENTOR
PETER SYNEK
BY *Winburn*
ATTORNEY

April 4, 1950 P. SYNEK 2,503,178
APPARATUS FOR AUTOMATICALLY MAKING BEADS
Filed July 8, 1947 8 Sheets-Sheet 5

INVENTOR
PETER SYNEK
BY
ATTORNEY

April 4, 1950 P. SYNEK 2,503,178
APPARATUS FOR AUTOMATICALLY MAKING BEADS
Filed July 8, 1947 8 Sheets-Sheet 7

Fig. 13.

INVENTOR
PETER SYNEK
BY
ATTORNEY

April 4, 1950 P. SYNEK 2,503,178
APPARATUS FOR AUTOMATICALLY MAKING BEADS
Filed July 8, 1947 8 Sheets-Sheet 8

INVENTOR
PETER SYNEK
BY
ATTORNEY

Patented Apr. 4, 1950

2,503,178

UNITED STATES PATENT OFFICE 2,503,178

APPARATUS FOR AUTOMATICALLY MAKING BEADS

Peter Synek, New York, N. Y.

Application July 8, 1947, Serial No. 759,485

5 Claims. (Cl. 49—7)

This invention relates to means for the manufacture of beads.

An object of the invention is to provide apparatus for the manufacture of beads of glass and other materials, which shall be characterized by novel constructional features and improved operation over that shown in U. S. Patents Nos. 2,348,035 and 2,348,036.

Another object of the invention is to provide bead manufacturing apparatus whereby the beads may be formed by means of a process which is not only continuous, but which is highly automatic.

A further object of the invention is to provide a bead manufacturing machine in which improved means is included for holding the plastic material from which the beads are made, for applying heat intermittently thereto to plasticized end of the material in contact with a wire upon which the beads are formed.

Still another object of the invention is to provide a bead manufacturing machine having improved means for feeding the wire from a reel to the position at which the bead material is placed in contact with the wire, the process by which this is done being intermittent and automatic.

Another object of the invention is to provide an improved bead manufacturing device which is simple in design, positive in operation, and adapted to manufacture a large number of beads in a short time, and at considerable saving in cost of labor and materials.

Other objects and advantages of the invention will become apparent from the following description of a preferred embodiment thereof as illustrated in the accompanying drawings, and in which.

In order to understand clearly the nature of the invention and the best means for carrying it out, reference may now be had to the drawings, in which like numerals denote similar parts throughout the several views.

My improved bead making apparatus comprises a hollow shaft 20, horizontally disposed and journaled for rotation in a pair of bearing members 22 and 24, the said bearing members being in turn mounted on an upright well 26 of a supporting frame 28. The supporting frame 28 comprises the wall portions 30 and 32 which are adapted to rest upon a main support comprising the table member 34 and the leg portions 36.

In accordance with my invention I provide a second hollow shaft 38 spaced from and in axial alignment with the hollow shaft 20 and mounted for rotational as well as axial movement in the following manner. A suitable bearing member 40 is mounted on the frame wall 26, in which there is disposed a bushing 42, hollow sleeve member 44 being journaled for rotation in the bushing. The sleeve member 44 is provided at one end with an outwardly extending flange 46.

Figure 12:
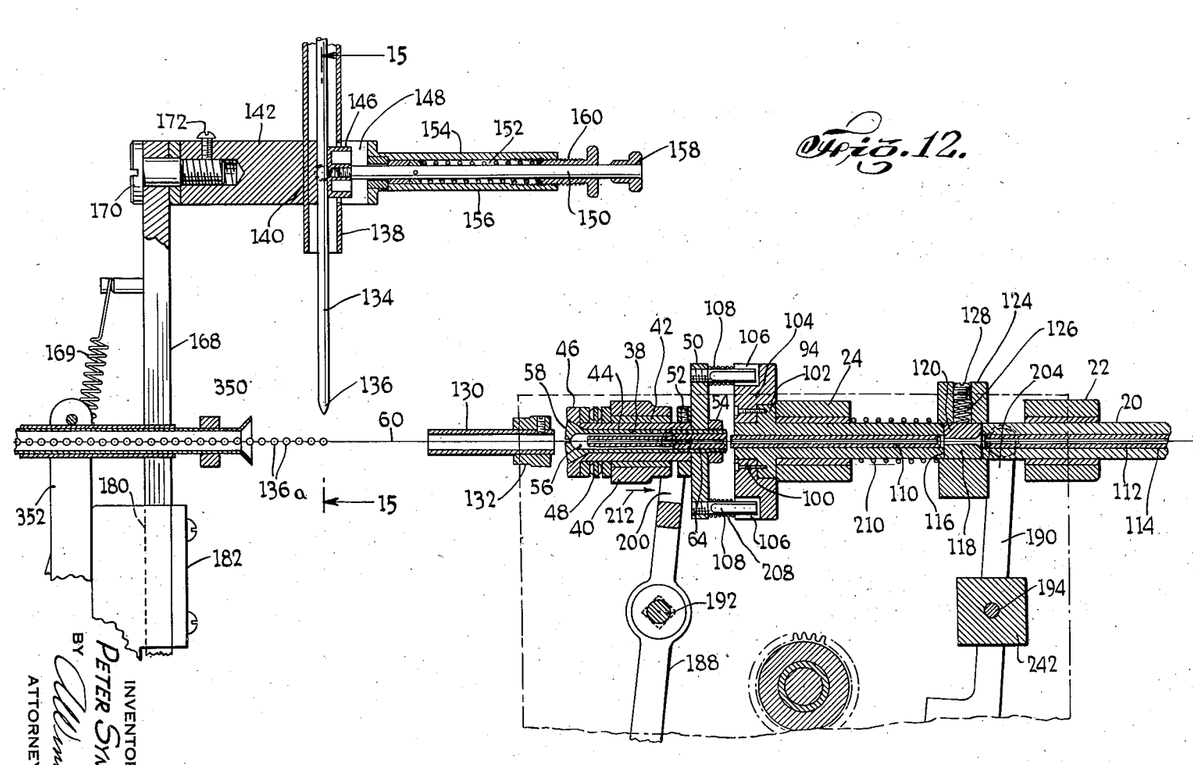
Fig. 12 is a sectional view taken on line 12—12 of Fig. 11.

An anti-friction thrust bearing 48 is mounted coaxially on the sleeve 44, between the flange 46 and the bearing elements 40 and 42, as best seen in Fig. 12.

A clutch plate or collar 50 in the form of a disc is mounted concentrically on the hollow shaft 38, being retained thereon by a jam nut 54 threaded onto the right hand end of the shaft as seen in Fig. 12. A ring 52 is secured coaxially upon the sleeve 44 by means of a set screw threaded radially therethrough and bearing against the underlying sleeve surface. A guide tube 64 is disposed in the bore 46 of the shaft 38, the tube also having an axial bore adapted to receive the wire 60, and enlarged at its right hand end to permit easy entrance of the wire. It will be seen that relative axial motion between the shaft 38 and its encircling sleeve 44 is possible, so that appropriate movement of the parts relative to each other will cause the chuck jaws 58 to be forced toward each other to grip the wire 60, and to release the the wire upon movement of the parts in the opposite relative direction.

Wire guide tubes 110 and 112 are disposed in the axial bore 114 of the hollow shaft 20, as best seen in Fig. 12, these tubes being axially bored to receive the wire 60. A diametral slot 116 is cut through the shaft 20 between the inner ends of the guide tubes 110 and 112, to receive slidably wire gripping shoes 118 and 120 which are retained in the slot by a collar 124 which is mounted concentrically on the shaft 20. The wire gripping shoes 118 and 120 are pressed toward each other by such means as a spring 126 disposed in a radial bore formed in the collar 124 and retained therein by a plug 128 which is threaded into the bore. The shoes are thus enabled to yieldingly grip the wire 60 passing therebetween.

A supply of the wire 60 is contained on a spool 66 rotatably mounted on a forked bracket 68, the said bracket in turn being fixed to a multiple pulley member 70 for rotation therewith, the pulley being in turn fixed to the hollow shaft 20 for rotation therewith. It will thus be seen that when the shaft 20 is rotated, the spool 66 will rotate therewith to cause axial rotation of the wire 60 within the hollow shafts 20 and 38 respectively.

The following means are employed for causing rotational movement of the hollow shaft 20. Journaled in suitable bearings 72 attached to the legs 36 is a horizontally disposed main driving shaft 74 on which there is mounted for rotation therewith a multiple pulley 76 in alignment with the pulley 70 and connected therewith by a belt 78. The main driving shaft 74 may be driven from any suitable source of power, such as a motor 80, secured to the underside of the frame table 34. The motor may be coupled to the shaft through belts 82 and 84 encircling respectively the pulleys 81 and 83 secured on the motor and the shaft 74, and also the pulleys 86 and 88.

Figures 1, 17, 18:
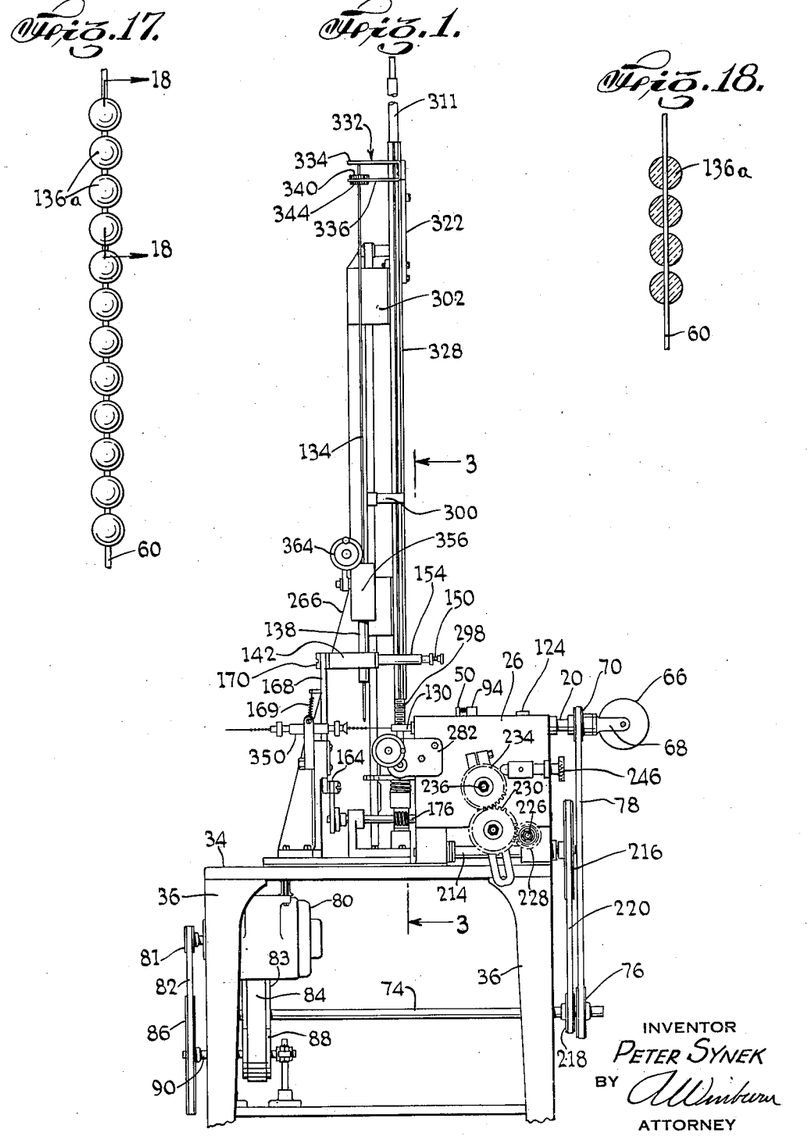
Fig. 1 is a front elevational view of my improved bead making machine.
Fig. 17 is a top plan view of the bead support wire with a number of beads formed thereon.
Fig. 18 is a sectional view taken on line 18—18 of Fig. 17.
Figures 2, 5, 6, 7:
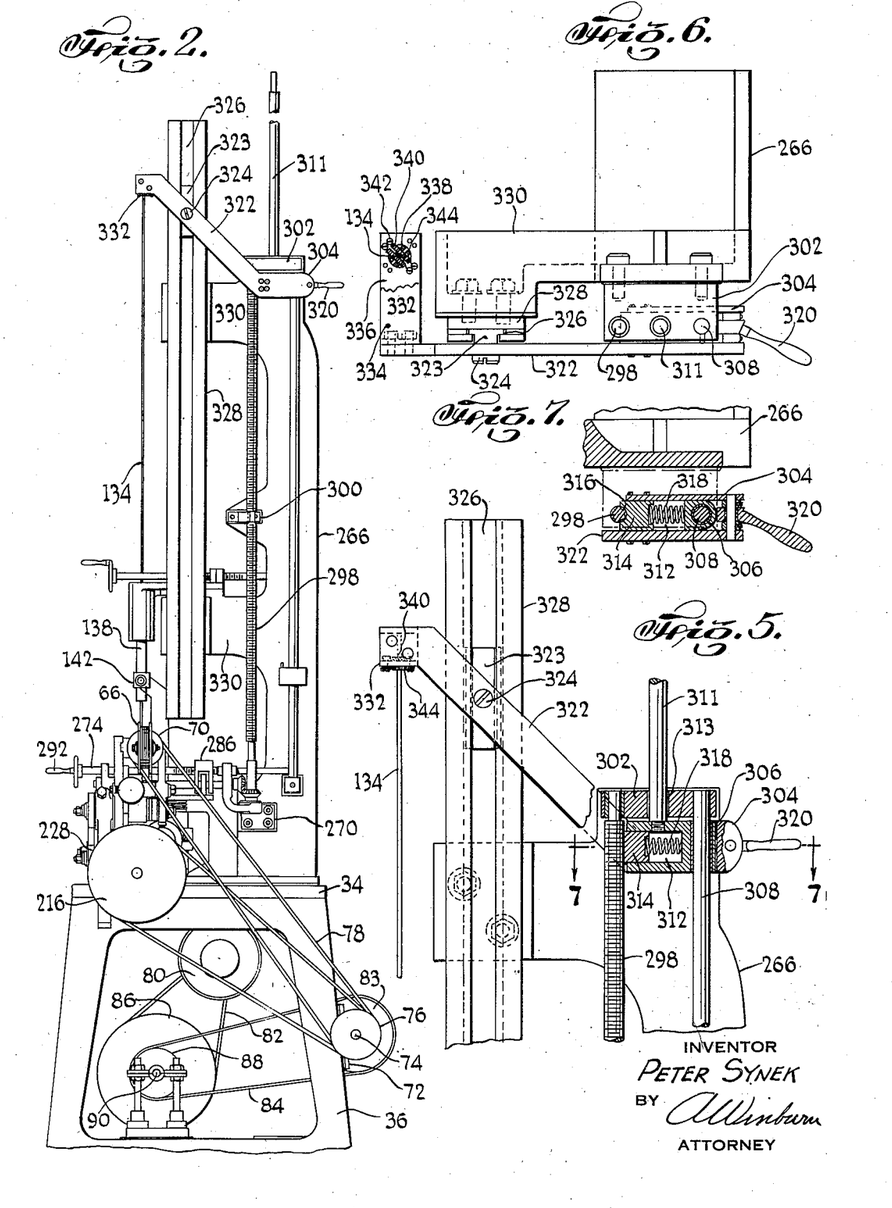
Fig. 2 is a right side elevational view of the machine shown in Fig. 1.
Fig. 5 is a fragmentary elevational view taken from the same plane as that of Fig. 2, and showing in enlarged representation, the upper portion of the machine, a part of the view being sectioned.
Fig. 6 is a top plan view of the parts shown in Fig. 5.
Fig. 7 is a fragmentary sectional view taken on line 7—7 of Fig. 5.

The latter pulleys 86 and 88 are secured on the rotatable connecting shaft 90, which is journaled in suitable bearings carried by the frame of the machine, as best seen in Figs. 1 and 2.

The following means are provided for causing the hollow shaft 38 to rotate simultaneously with the hollow shaft 20. A clutch pressure plate 94 has an axial bore to receive the left hand end of the shaft 20, the bore being enlarged as shown in Fig. 12 to receive the flange 102 on the shaft, the pressure plate being thus secured rigidly to the shaft for rotation therewith and held in place by means of screws 104. The plate 94 is provided with grooves or recesses 106 extending inwardly from the periphery thereof and adapted to slidably receive therein a pair of correspondingly positioned pins 108, the said pins being in turn fixedly attached to the cooperating clutch disc 50 which is secured to the hollow shaft 38 for rotation therewith.

The wire 60 projects beyond the chuck 58 and is passed through a wire guiding tube 130 secured to a bracket 132 carried by the frame 26, the tube being in axial alignment with the hollow shafts 38 and 20 and adapted to receive the wire therefrom. The wire protrudes out of the tube 130 into the path of the material from which the beads are to be made, such material being shown in the drawings as a glass rod 134, but which it is understood may be in any other suitable form.

In accordance with my invention, as hereinbefore described, I provide the following means for supporting the glass rod 134, heating a portion of the rod to plasticize the same and bringing the plastic portion thereof into intimate contact with the rotating wire 60 to form a bead 136. The glass rod 134 is mounted in such manner that the tip 136a thereof is normally out of contact with and slightly spaced from the wire 60. The rod 134 may extend through a brake tube 138 extending through an opening 140 in an elevating housing or arm 142, being retained therein by set screws 144 shown in Fig. 15.

A brake shoe 146, as seen in Fig. 12, extends slidably into an opening formed in the wall of the tube 138 and through a slot 148 in the arm 142, so as to bear against the glass rod 134, thus yieldingly retaining it in position relative to the wire 60. The brake shoe 146 is carried on the inner end of the push plunger 150 which extends through the axial radial bore 152 in the elevating arm tube 154, being encircled by the spring 156 which thus presses the plunger and shoe 146 inwardly against the glass rod. The plunger has a handle 158 which may be grasped to pull the shoe 146 away from the glass rod, freeing the latter for adjustment of its position, and also during the insertion of a new glass rod.

The bushing 160 is threaded into the bore 152 to bear against the spring, whereby the degree of pressure by the shoe on the glass rod is regulated. A number of gas burners 162 of any suitable design are supported on a fixed bracket carried by the machine frame in such position as to throw their flames inwardly toward and directly at the tip 136 of the glass rod when the rod tip is in its position shown in Fig. 16. The heat of the flames will plasticize the said tip 136 so as to cause the same to flow toward the wire 60 to contactively engage the same and form a bead as the wire rotates.

Figures 14, 15:
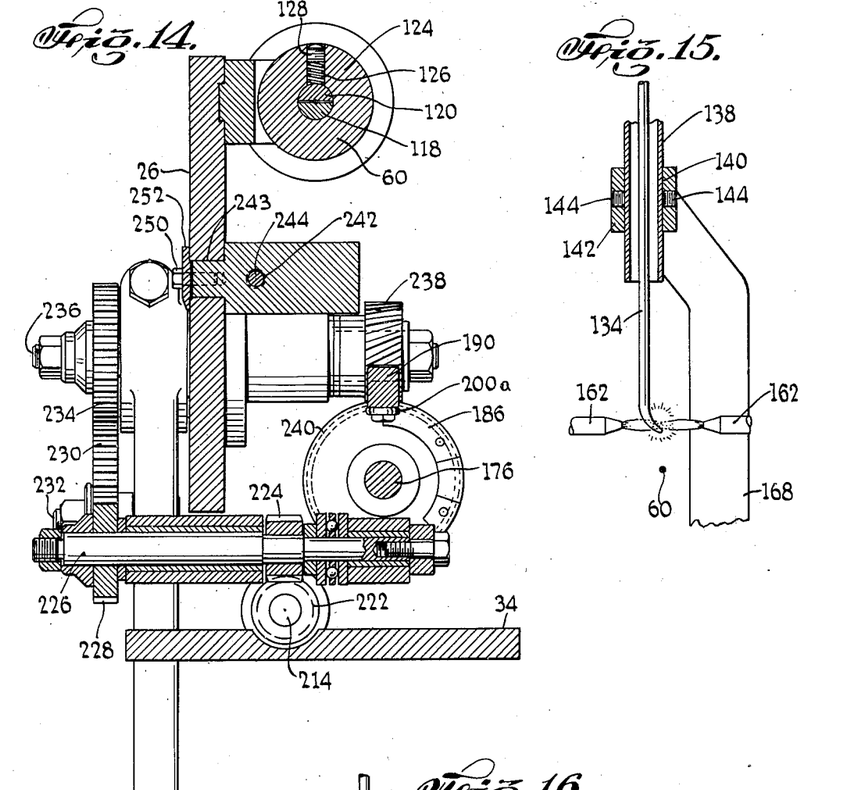
Fig. 14 is a sectional view taken on line 14—14 of Fig. 4.
Fig. 15 is a fragmentary sectional view taken on line 15—15 of Fig. 12, showing the plastic feed rod in retracted position out of contact with the wire.

When sufficient material has been drawn off the rod to form a bead, the rod 134 is then moved upwardly to the position shown in Fig. 15, out of contact with the wire 60. The gas burners may be supplied with gas from any suitable source of supply through gas pipes controlled by suitable valves. It will be noted that the gas flames are directed so as not to affect the wire 60, thus preventing sagging or breaking of the wire.

The feeding of the glass rod in the above manner, may be accomplished automatically as described below. To this end I provide a cam roller 164, rotatably mounted on a pin 166 carried on the lower end of arm 168 the upper end of which is pivotally secured to the outer end of the arm 142 by means of a pin 170, the pin being secured against withdrawal by a set screw 172. The cam roller 164 is designed to ride upon the rim of a suitably designed cam 174.

The cam 174 is mounted on a cam shaft 176 for rotation therewith, the shaft being journaled in bearings 178 secured to the frame table 34, by means of suitable brackets. To retain the arm 168 in upright position, and at the same time to guide the same in its movement, there is provided a slotted aperture 180 in the upper end of the bracket 182 which is mounted on the frame table 34, to permit vertical reciprocal movement of the said arm 168. A spring 169 is secured between the arm 168 and the bracket 182 to maintain the roller 164 in contact with the cam 174.

Figure 16:
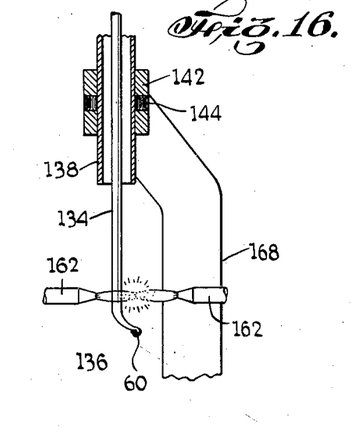
Fig. 16 is a view similar to that of Fig. 15, but showing the plastic feed rod in lower position where it is in contact with the wire.

As hereinabove described, after a bead has been made, the wire is automatically moved axially for a predetermined distance so that it will be in proper position for the making of a second bead, after which it is again axially moved to be in position for a third bead and so on until any desired number of beads are manufactured. I have provided the following mechanism for effecting such intermittent axial movement of the wire, which is so synchronized with respect to the movement of the arm 168, caused by the cam 174 and roller 164, that the wire 60 will be axially advanced while the glass rod is in its upper position shown in Fig. 15, after which the rod tip 136 will be automatically lowered into the path of the flames issuing from the gas burners 162 and after being heated thereby to plastic state, brought into contact with the rotating wire 60 as shown in Fig. 16, to form a bead.

Figure 11:
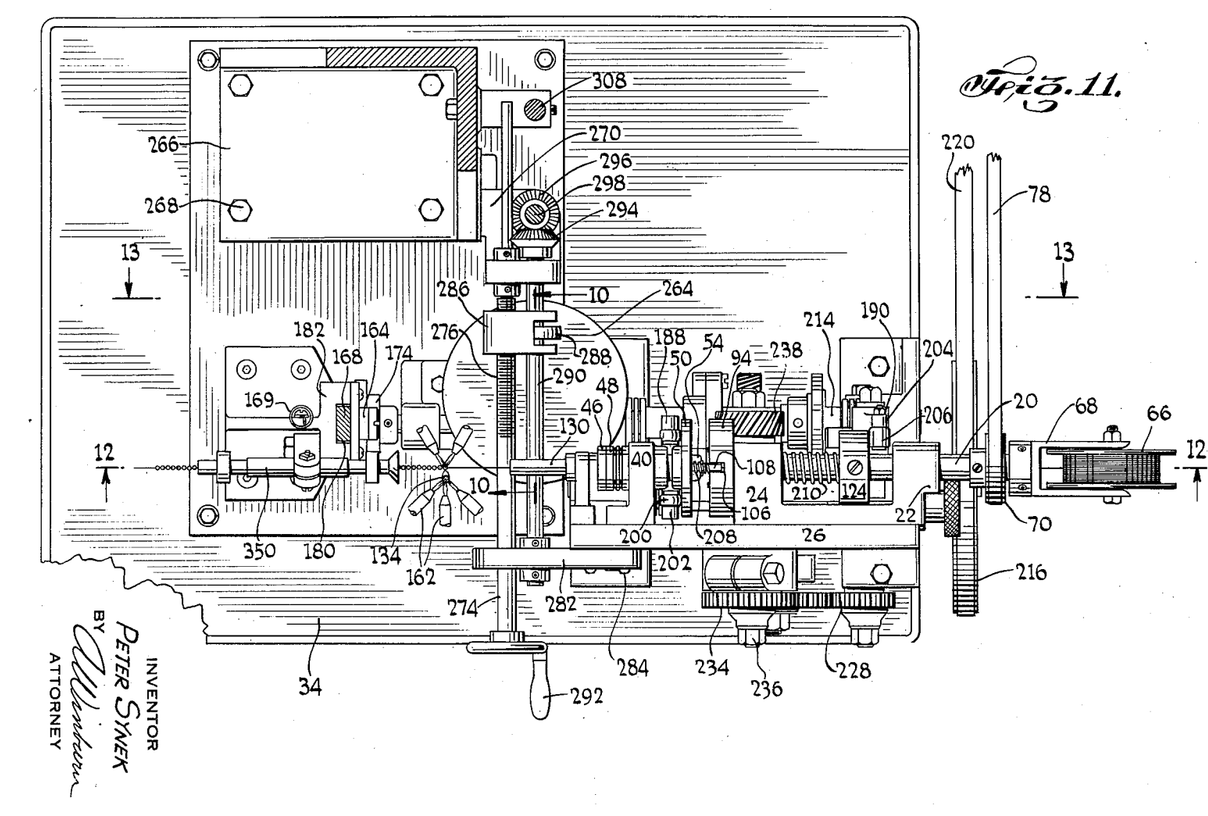
Fig. 11 is a sectional view taken on line 11—11 of Fig. 4.
Figure 13:
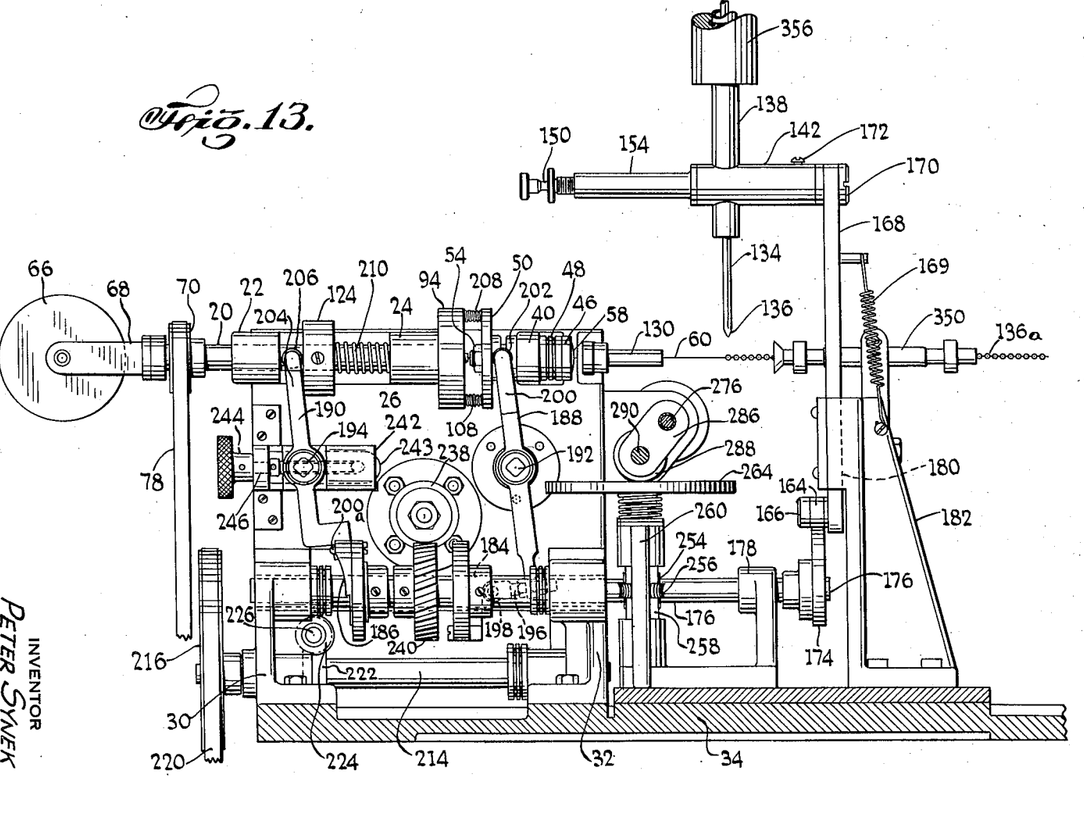
Fig. 13 is a sectional view taken on line 13—13 of Fig. 11.

Mounted on the cam shaft 176 for rotation therewith are the cams 184 and 186. A pair of levers 188 and 190 are rotatably mounted on the pivots 192 and 194 respectively supported by the wall 26 of the frame of the machine. Mounted at one end of the lever 188 for movement therewith is a bracket 196 on which there is rotatably mounted a cam roller 198 adapted to cooperate with the cam 184. Rotatably mounted at one end of the lever 190 is a cam roller 200a designed to cooperate with the cam 186. The opposite end of the lever 188 from that of the roller 198 is provided with a forked portion 200, the prongs of which straddle the shaft 38 and sleeve 44. The forked portion 200 is provided with a pair of abutment members 202 which are designed to be adjacent to and abut the clutch plate 50, as shown in Figs. 11 and 13.

Similarly the lever 190 is provided with a single prong extension 204 which extends around the shaft 20, a pressure roller 206 being rotatably mounted on a pin threaded into the extension 204 and designed to lie adjacent to and abut the collar 124. In accordance with my invention, the cams 184 and 186 are so synchronized with respect to the levers 188 and 190 that when the glass rod 134 is away from and out of contact with the wire 60, the said wire will be axially moved into a position for the making of another bead in the following manner.

When the cam shaft 176 is rotated, the cam roller 200 in sliding from the low to the high point on the cam 186, will cause the portion 204 of the lever 190 to rotate in a counter-clockwise direction, as viewed in Fig. 12, to slidably move the collar 124 on the shaft 20. The shoes 118 and 120, gripping the wire 60 therebetween, will draw the wire in a leftward direction as seen in Fig. 12, unwinding a corresponding portion of the wire from the spool 66. The surfaces of the shoes which bear against the wire may be so formed as to facilitate the gripping action during the movement of the wire in the leftward direction, but having little or no gripping action during the return of the collar 124 in a rightward direction to initial position after having advanced the wire.

My apparatus is so designed that at the same time that the lever 190 is about to start to advance the wire as just described, the forked upper portion 200 of the other lever 188 is caused to be rotated in a counter-clockwise direction by means of the cam 184 and roller 198, to permit the springs 208, surrounding the pins 108, to urge the shaft 38 to slidably move toward the left as seen in Fig. 12. This will cause the chuck 58 to be relieved of its compression force from the sleeve 44, to thereby permit free sliding movement of the wire 60 therethrough in a leftward direction.

Upon continued rotation of the cam shaft 176, the roller 200a again will reach the low area on the cam 186 and the collar 124 will be restored to its original position shown in Fig. 12, by means of a spring 210 surrounding the shaft 20, and interposed between the bearing 24 and the sliding collar 124. At the same time the roller 198 will have reached the high point on the cam 184 to cause the clutch disc 50 to move in the direction of the arrow 212, that is, to the right as seen in Fig. 12, and against the action of the springs 208, and the chuck 58 will again have gripped the wire 60 for rotation therewith.

The following means are provided for causing the synchronous rotational movement of the cam shaft 176 from the main driving shaft 74. Journaled in the supports 30 and 32 is an auxiliary shaft 214 which is driven from the main driving shaft 74 by means of a pulley 216 mounted on the shaft 214, and a pulley 218 mounted on the shaft 74, the said pulleys being interconnected by a belt 220. Mounted on the shaft 214 for rotation therewith is a worm gear 222 in mesh with a similar gear 224 mounted on a shaft 226.

Mounted on the shaft 226 for simultaneous rotation with the gear 224 is a second gear 228 in mesh with a gear 230 mounted on the shaft 232. The gear 230 is also in mesh with a gear 234 mounted on the shaft 236. The shafts 226, 232 and 236 are supported by the frame 26 of the machine. Fixed to the shaft 236 for simultaneous rotation with the gear 234 is a second worm gear 238 in mesh with a corresponding worm gear 240 mounted on the cam shaft 176 for rotation therewith.

It is thus seen from the above described construction, that when the main driving shaft 74 is rotated, the auxiliary shaft 214 will be rotated through the pulleys 216 and 218 and the belt 220, the cam shaft 176 will be rotated through the chain of gearing 22, 224, 228, 230, 234, 238 and 240. At the same time the shaft 20 will be rotated through the pulleys 70 and 76 and the belt 78, while the shaft 38 may be simultaneously rotated with the shaft 20 by means of the cooperating clutch members 50 and 94 as hereinbefore described.

It is also further seen from the above described description, that the amount of advance movement of the wire 60, or in other words, the spacing between the beads 136 on the wire, is governed by the amount of oscillation of the upper prong of the lever 190. Instead of mounting the pivot shaft 194 directly on the frame 26, I mount the same for lateral sliding movement in a bracket 242, said bracket being slidably mounted in the opening 243 in the frame 26, adjustment of the position of the pivot shaft being effected by screw member 244 passing through an opening 246 in the bracket and threaded through the shaft. The position of the bracket is adjusted by loosening the fastening screw 250 and its clamp 252 and shifting the bracket laterally.

The screw 244 is provided with an enlarged knurled head, so that when the head is turned, the pivot shaft will be moved laterally by means of its threaded shank.

In accordance with my invention, I also provide means whereby the glass rod 134 may be automatically fed a predetermined distance in a direction toward the wire 60 each time the said rod reciprocates to compensate for the amount that the rod has been shortened due to drawing off of the glass material from the rod 134 to make a bead. The construction will become apparent from the following description.

Figures 4, 10:
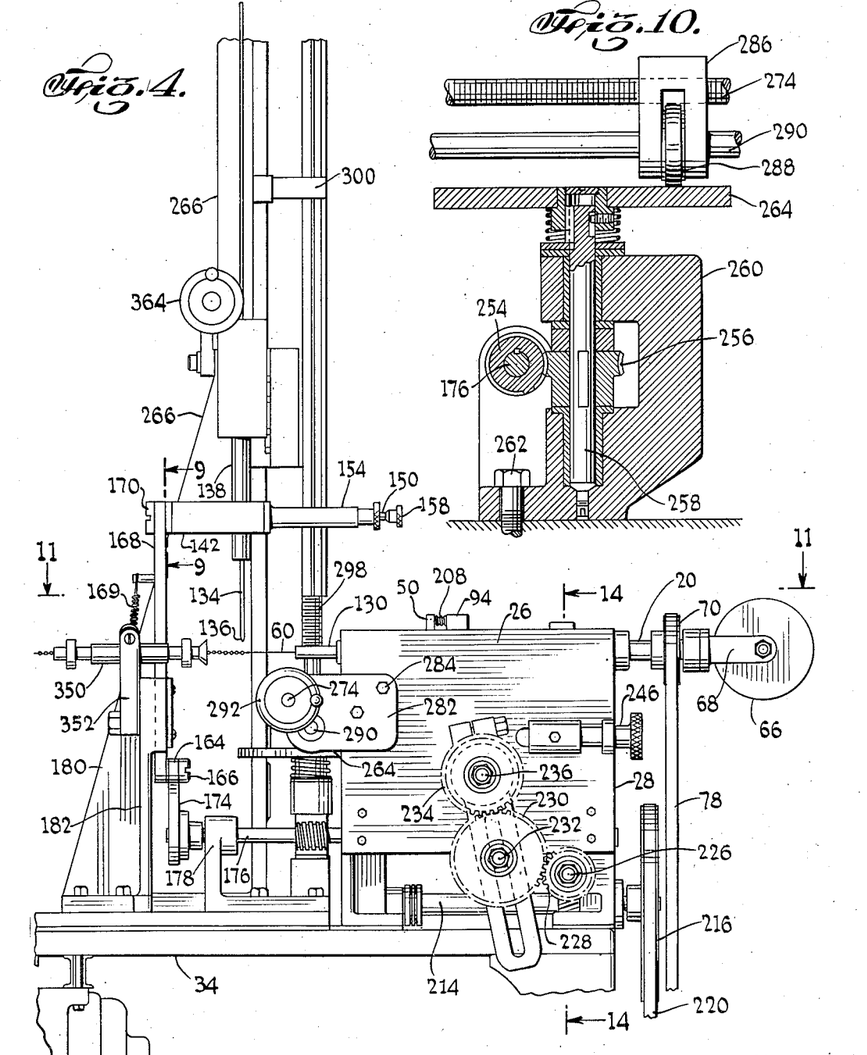
Fig. 4 is a fragmentary front elevational view taken from the same plane as that of Fig. 1, and showing in enlarged representation, the central portion of the machine.
Fig. 10 is a fragmentary sectional view taken on line 10—10 of Fig. 11.

As shown in Figs. 4, 10 and 13, a worm 254 is mounted on the cam shaft 176 for rotation therewith, and intermeshes with a worm gear 256 which is mounted on the vertical shaft 258 for rotation therewith, the vertical shaft being journaled in bearings formed in a bracket 260 secured to the table 34 by screws 262. A variable speed disc 264 is mounted on the upper end of the shaft 258 for rotation therewith, so that rotation of the cam shaft 176 causes the rotation of the disc plate 264.

An upright bracket 266 is secured to the frame table 34 by means of screws 268. As shown best in Figs. 3 and 11, a bracket 270 is secured to the face of the bracket 266, the upper arm 272 of the bracket. A traversing rod 274, which is threaded at 276, is journaled at one end in a bearing formed in the arm 272 of the bracket 270, and has its other end portion journaled in a bearing 280 formed in a bracket plate 282 secured to the frame wall 26 by screws 284. A forked guide rider 286 has a lateral bore which is threaded to receive the threaded portion of the rod 274. A friction roller or driven wheel 288 is rotatably disposed between the prongs of the rider 286, with its periphery riding upon the upper plane surface of the drive disk 264, so as to be rotated thereby. The roller wheel 288 is mounted on a shaft 290 for rotation therewith, the shaft 290 being journaled at one end in a bearing aperture formed in the plate 282, so that rotation of the disk 264 causes rotation of the shaft 290, the speed of the shaft 290 being adjusted by turning the hand wheel 292 to adjust the diametral position of the driven roller 288 on the disc 264.

A gear 294 which is mounted on the shaft 290 for rotation therewith, meshes with a gear 296 which is mounted on a vertical shaft 298 for rotation therewith, the shaft 298 being journaled in vertical bearings formed in the brackets 270, 300 and 302 carried by the support bracket 266. A position adjusting clamp 304 has a vertical bore 306 to slidably receive a vertical guide rod 308 which is secured in openings formed in brackets 310 and 302 on the frame 266, the rods 298 and 308 thus being mutually parallel.

The clamp 304 has a recess 312 in which is slidably disposed a shoe 314 which is arcuately recessed and threaded at 316 to bear against and engage with the threads on the rod 298, being biased into engagement therewith by a spring 318, as best seen in Figs. 5 and 7. A toggle lever 320 is pivotally carried by the clamp 304 in such manner that when the lever is actuated by being bent from normally extended position, the shoe 314 is pulled to the right against the spring action, to disengage the clamp from the threaded rod 298, at which time the vertical position of the clamp may be adjusted, by sliding it up or down on the guide rod 308. Upon release of the toggle lever, the threads of the shoe 314 once again engage with the threaded rod 298.

It will be apparent that as the rod 298 turns in a suitable direction about its vertical axis, the clamp 304 will traverse the rod 308 in a downward direction. A support arm 322 is secured at one end to the traveling clamp 304 to travel therewith, an intermediate portion of the arm 322 being pivotally secured to a guide shoe 323 by means of a pin 324, the shoe being slidable in a slot 326 formed in a guide plate 328 secured in a vertical position to arms 330 which are integral with the support bracket 266.

A U-shaped bracket 332 having upper and lower plates 334 and 336 interconnected at one end by a vertical web is secured by the web to the upper end of the arm 322 so as to be movable therewith in a vertical direction. An aperture 338 is formed in the lower plate 336, to receive the upper end of the glass rod 134, as best shown in Figs. 1, 2, 5 and 6. An upper pair of springs 340 is disposed side by side across the upper surface of the aperture 338, as shown in Figs. 1 and 6, being secured thereat by screws 342 extending into the lower plate 336. A similar pair of lower springs 334 is disposed side by side across the lower surface of the aperture 338, but at right angles to the upper springs 340, being similarly secured in position by screws.

It will be seen that the glass rod 134 may extend upwardly between the two lower springs, and then through the space between the two upper springs, so as to be frictionally embraced thereby, and yieldingly retained in a vertical position, and substantially in the center of the aperture 338. Having passed through both pairs of springs, the uppermost tip of the glass rod may extend into contact with the under-surface of the upper plate or platform 334, as shown best in Fig. 1, so that downward movement of the arm 322 and the bracket 332 as the threaded rod 298 turns, will cause the glass rod 134 to undergo downward motion toward the wire 60.

As the camshaft 176 turns, causing the vertical reciprocation of the arm 168 and hence the glass rod 134 between the upper and lower positions shown in Figs. 15 and 16, it is apparent that glass from the lower tip of the glass rod will be constantly drawn off onto the wire 60 to make beads, and that it is necessary to constantly lower the glass rod 134 just a little bit further each time it moves downwards, in order to compensate for the loss of glass at its tip 136 by which the rod is thus shortened. It will be apparent from the above description that this is accomplished by the mechanism carried on the support bracket 266 as just described.

Thus, each time the glass rod 134 is elevated during the upstroke of the lever 168, it will be found that the continuous rotation of the threaded feed rod 298 has caused the travel limiting bracket 332 to be moved downward a little lower than it was at the time of the last upward motion of the lever 168 and the glass rod. As a result, although the glass rod slides upwards easily between the springs 340 and 344, its upper tip cannot pass upwards beyond the new lower position of the upper platform 334 of the bracket 332.

And since the bracket 332 will not yield upwards, the glass rod must slide downwards a little, past the shoe 146 shown in Fig. 12 which yields slippingly for this purpose, the glass rod thus being progressively fed toward the wire 60 more and more as its lower tip is consumed and its total length is shortened during the process of bead making. When a new glass rod is to be installed to replace an old one that has been consumed, the toggle handle 320 is bent as described to withdraw the shoe 314 from contact with the threaded rod 298 of Figs. 6 and 7, and the lever 322 raised to an upper position, to accommodate the longer length of the new glass rod, the shoe 146 being also retracted by knob 158 to allow the new glass rod to be received, as seen in Fig. 12.

An upper guide rod 311 extends slidably through an opening 313 in the bracket 302, as shown in Fig. 5, with its lower end threadedly secured to the clamp 304, the rod 311 thus moving with the clamp.

It will thus be seen that a large number of beads may be made successively in an automatic manner, the beads and the wire on which they are formed being fed in a leftward direction as seen in Fig. 12, through a guide tube 350 carried on the bracket 180, by means of a clamp 352, the beads being fed thence into any convenient receptacle or onto a receiving bench.

Figures 3, 8, 9:
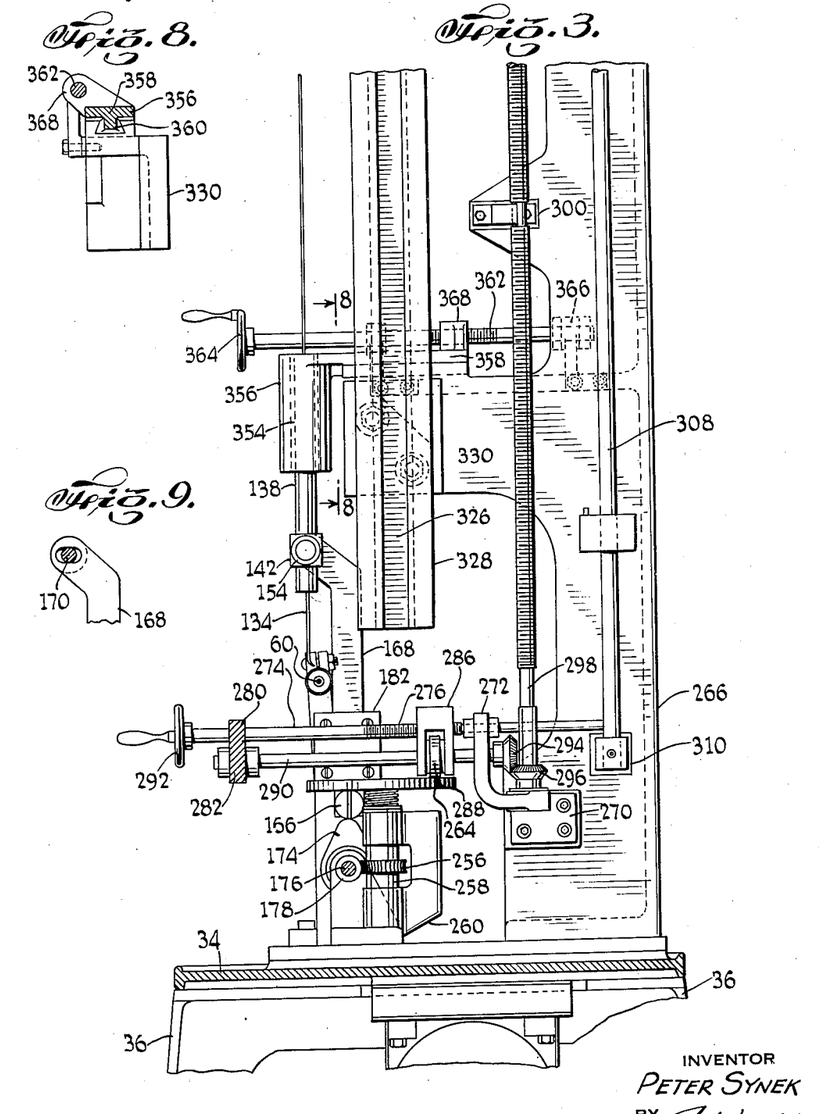
Fig. 3 is a sectional view taken on line 3—3 of Fig. 1.
Fig. 8 is a fragmentary sectional view taken on line 8—8 of Fig. 3.
Fig. 9 is a fragmentary sectional view taken on line 9—9 of Fig. 4.

The glass rod guide tube 138 extends slidably upwards into a bore 354 formed in a housing 356, an arm 358 of which is so formed as to slide in a groove 360 formed in the upper surface of the extension 330 of the bracket 266. A traversing rod 362 having a handwheel 364 at one end for turning the same, is threaded through a bore in the upward extension 368 of the arm 358, the rod 362 being journaled in bearings 366 formed in the extension 330 of the stationary bracket 266 and confined to axial rotation only by collars carried by the rod 362. It will be seen that the position of the housing 356, the tube 138, and hence the glass rod 134 may be varied relative to the wire 60, by turning the hand wheel 364, moving the glass rod to the right or left as seen in Fig. 3.

Although I have described a preferred embodiment of my invention in specific terms, it is to be understood that various changes may be made in size, shape, material and arrangement without departing from the spirit and scope of the invention as claimed.

Having described my invention, what I claim and desire to secure by U. S. Letters Patent is:

1. In a bead making machine of the class described having a frame, and wherein one end of a glass rod is heated to plasticise the same after which it is brought into intimate contact with an axially rotating wire long enough to form a bead and thereafter withdrawn, means for causing said rod to automatically advance toward the wire prior to each contact therewith, said last-named means comprising stop means disposed in the path of the upper end of the rod, said stop means being so supported by the frame as to cause the rod during its upward travel to strike against the undersurface of said stop means, and means for continuously moving said stop means in a downward direction, so that each successive time the rod is to strike thereagainst, the stop means is in a lower position than during the preceding striking movement, whereby the rod is pushed downwardly by the unyielding stop means by a predetermined distance, and whereby the progressive consumption of the rod during the bead making process is compensated for.

2. In a bead making machine of the class described having a frame, and wherein one end of a glass rod is heated to plasticise the same after which it is brought into intimate contact with an axially rotating wire long enough to form a bead and thereafter withdrawn, means for causing said rod to automatically advance toward the wire prior to each contact therewith, said last-named means comprising a support for said rod constructed to yield so as to permit said rod to be pushed downwardly toward the wire under the influence of force applied to the rod, stop means supported by the frame and disposed in the path of the upper end of the rod, said stop means being so arranged as to be struck by the rod during its upward travel, said means for continuously moving said stop means in a downward direction toward said rod, so that each successive time the rod moves upward toward the upper limit of its oscillatory travel the stop means is interposed in the way to block movement of the upper end of the rod to a position higher than the stop means, the rod being thus pushed downward by the stop means in its yielding support, and whereby progressive consumption of the rod is compensated for.

3. In a bead making machine of the class described having a frame, and wherein one end of a glass rod is heated to plasticise the same after which it is brought into intimate contact with an axially rotating wire long enough to form a bead and thereafter withdrawn, means for causing said rod to automatically advance toward the wire prior to each contact therewith, said last named means comprising a main bracket supported on said frame, a stop member carried by said main bracket and disposed in the path of the upper end of the rod whereby the said rod end strikes against the stop member during its upward travel, whereby the rod is thus automatically advanced toward the wire to compensate for said progressive consumption thereof.

4. In a bead making machine of the class described having a frame, and wherein one end of a glass rod is heated to plasticise the same after which it is brought into intimate contact with an axially rotating wire long enough to form a bead and thereafter withdrawn, means for causing said rod to automatically advance toward the wire prior to each contact therewith, said last named means comprising a main bracket supported on said frame, a guide rod supported by said bracket, a traversing clamp movable on said guide rod along an axis parallel to that of the bead making rod, a stop member carried by said traversing clamp and disposed in the path of the upper end of the said bead making rod so as to be struck by the said upper end of the rod during the upward travel of the rod, and means for continuously moving the stop member in a downward direction toward said wire, so that upon each upward movement of the bead making rod its upper end encounters the stop member in a lower position than the preceding position thereof, and whereby upon striking against the unyielding stop the bead making rod is pushed downwards in its slippable support toward said wire, and whereby the rod is thus fed toward said wire to compensate for the consumption thereof during the bead making process.

5. In a bead making machine of the class described having a frame, and wherein one end of a glass rod is heated to plasticise the same after which it is brought into intimate contact with an axially rotating wire long enough to form a bead and thereafter withdrawn, means for causing said rod to automatically advance toward the wire prior to each contact therewith, said last named means comprising a main bracket supported on said frame, a guide rod supported by said bracket, a traversing clamp movable on said guide rod along an axis parallel to that of the bead making rod, a stop support lever carried by said clamp, a stop member carried by said stop support lever and disposed in the path of the upper end of said bead making rod so as to be struck by the upper end of the rod during the upward travel of the rod, a traversing screw member journaled in said main bracket with its axis parallel to that of the said guide rod, releasable threaded means on said clamp for threadedly engaging said traversing screw member, said screw member being continuously rotatable during the operation of said apparatus, whereby said stop means is continuously carried in a downward direction toward said wire, so that upon each upward movement of the bead making rod its upper end encounters the stop member in a lower position than that of the last preceding position thereof, and whereby, upon striking against the unyielding stop member the bead making rod is pushed downwards in its slippable support toward said wire, and whereby the rod is thus fed toward said wire by a predetermined amount after each bead is made, to compensate for the consumption of the rod during the process.

PETER SYNEK.

REFERENCES CITED

The following references are of record in the file of this patent:

UNITED STATES PATENTS

| Number | Name | Date |
|---|---|---|
| 2,348,035 | Synek | May 2, 1944 |